(12) United States Patent
Salsbury et al.

(10) Patent No.: US 12,114,138 B2
(45) Date of Patent: Oct. 8, 2024

(54) MULTI-VEHICLE AUDIO SYSTEM

(71) Applicant: Ford Global Technologies, LLC, Dearborn, MI (US)

(72) Inventors: Ian Salsbury, Wickford (GB); Jonathan Gregory, Colchester (GB); Parhum Purser, South Croydon (GB); Benjamin Moffatt, Iver Heath (GB); Jose G. das Neves Alves, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 422 days.

(21) Appl. No.: 17/505,831

(22) Filed: Oct. 20, 2021

(65) Prior Publication Data
US 2023/0121724 A1    Apr. 20, 2023

(51) Int. Cl.
| | |
|---|---|
| *H04R 5/00* | (2006.01) |
| *B60W 10/30* | (2006.01) |
| *B60W 60/00* | (2020.01) |
| *H04R 3/12* | (2006.01) |
| *H04R 5/02* | (2006.01) |

(Continued)

(52) U.S. Cl.
CPC ............... *H04R 3/12* (2013.01); *B60W 10/30* (2013.01); *B60W 60/0025* (2020.02); *H04R 5/02* (2013.01); *H04W 4/025* (2013.01); *H04W 4/46* (2018.02); *B60W 2556/65* (2020.02); *B60W 2710/30* (2013.01); *H04R 2499/13* (2013.01)

(58) Field of Classification Search
CPC ...... H04R 3/12; H04W 4/46; B60W 60/0025; B60W 2556/65

USPC .................................................... 381/86, 1
See application file for complete search history.

(56) References Cited

U.S. PATENT DOCUMENTS

| | | | |
|---|---|---|---|
| 8,983,383 B1 * | 3/2015 | Haskin | H04M 1/6041 455/556.1 |
| 9,936,322 B2 | 4/2018 | Park et al. | |
| 10,015,595 B2 | 7/2018 | Lee | |

(Continued)

FOREIGN PATENT DOCUMENTS

| | | |
|---|---|---|
| EP | 2950304 A1 | 12/2015 |
| EP | 3496426 A1 | 6/2019 |

(Continued)

OTHER PUBLICATIONS

GB Search and Examination Report of GB Application No. 2214794.6 dated Apr. 11, 2023.

*Primary Examiner* — William J Deane, Jr.
(74) *Attorney, Agent, or Firm* — Haley Guiliano LLP

(57) ABSTRACT

Methods and systems for using audio output devices to output audio content are provided. The audio output devices are provided in autonomously controllable vehicles. The vehicles are instructed to move to respective locations based on an audio output mode. For example, the vehicles may be arranged in a first configuration for a stereo sound mode and instructed to play left-channel or right channel audio data according to their location. The vehicles may be autonomously controlled to move into a different configuration for outputting audio content in another audio mode, for example, a surround sound mode. Where the audio output device is provided in a vehicle interior, such as internal speakers in a car, the vehicle may be instructed to, while playing the audio content, open the door and/or window.

18 Claims, 9 Drawing Sheets

(51) Int. Cl.
*H04W 4/02* (2018.01)
*H04W 4/46* (2018.01)

(56) References Cited

U.S. PATENT DOCUMENTS

| | | | | |
|---|---|---|---|---|
| 2008/0317592 A1* | 12/2008 | Adler | ................... | F04D 29/605 |
| | | | | 415/213.1 |
| 2010/0271983 A1* | 10/2010 | Bryant | ................... | H04B 1/385 |
| | | | | 370/352 |
| 2016/0366528 A1* | 12/2016 | Landqvist | ............... | H04M 9/00 |
| 2018/0063640 A1 | 3/2018 | Lee | | |
| 2019/0279440 A1 | 9/2019 | Ricci | | |

FOREIGN PATENT DOCUMENTS

| EP | 3515093 A1 | 7/2019 |
|---|---|---|
| WO | WO 2019168355 | 9/2019 |
| WO | 2020246136 A1 | 12/2020 |

* cited by examiner

MULTI-VEHICLE AUDIO SYSTEM

FIELD

The present disclosure concerns a method and a system for presenting audio content, or an audio component of multimedia content, using audio output devices provided in multiple vehicles. In particular, the present disclosure relates to using driver assistance systems located in the vehicles to provide one or more audio output modes.

BACKGROUND

Media systems with multiple speakers can present audio content, such as music, speech, or an audio component of multimedia content, in different output modes. A user may wish to switch between output modes to achieve a particular audio effect. For example, a user might use a "stereo sound" mode to play music, but then switch to a "surround sound" mode to listen to output of the audio component of a film being displayed on their television.

While switching between modes is straightforward in a home entertainment system, the ability to switch between modes may be more limited in an environment, such as an outdoor music festival, in which the audio content is output over a much larger area. For instance, the number of available output modes may be limited by the fixed number and positioning of the speakers in a public address system.

SUMMARY OF INVENTION

According to a first aspect, there is provided a method for presenting audio content in an audio output mode, comprising determining respective locations for a plurality of audio output devices based on the audio output mode, wherein the plurality of audio output devices are located in respective vehicles, and each of the respective vehicles include a driver assistance system; transmitting, to each of said vehicles, an instruction for the driver assistance system to move the vehicle to the respective location; determining, based on the audio output mode, one or more audio settings for output of the audio content by respective ones of the plurality of audio output devices; and transmitting, to each vehicle of the plurality of vehicles, an instruction to play audio content through the audio output device in the respective vehicle based on the determined settings.

In this manner, audio content may be output in a particular audio output mode by positioning the vehicles in an appropriate configuration relative to each other and, optionally, relative to one or more users consuming the audio content. For example, a surround sound mode may be achieved by arranging the vehicles to the front and rear of a group of users, while an auditorium mode may be achieved by surrounding the group of users with the vehicles. Furthermore, a switch to a different audio output mode may be accomplished by controlling the vehicles to change their positions relative to each other and/or the one or more users.

In one example, the audio output devices are used to output an audio component of a multimedia asset in conjunction with display of a video component. For example, the audio output devices may output the audio from a video or film displayed on a screen.

The movement of the vehicles and the output of the audio content may be controlled by a control system of one of the vehicles or, alternatively, may be controlled by a master device that is external to the vehicles, such as an external server, smartphone, tablet or laptop computer.

The method may include updating a location for a first one of the audio output devices based on a location of a vehicle in which the first audio output device is provided, for example, as indicated by location information received from the vehicle indicating its location relative to one or more users and/or one or more other vehicles of the plurality of vehicles. A further instruction may then be transmitted to the first vehicle, the further instruction being an instruction for the driver assistance system of the first vehicle to move the vehicle to the updated location. In this manner, adjustments to the locations of one or more of the vehicles may be made to improve the experience of the audio output mode by taking into account the position of the one or more users relative to the audio output devices.

The method may include updating the locations for the plurality of audio output devices based on a different audio output mode, transmitting a further instruction to at least one of the vehicles, the further instruction being an instruction for the driver assistance system of the at least one vehicle to move the vehicle to a respective one of the updated locations. In this manner, when switching to the different audio output mode, the audio output devices may be automatically moved into an appropriate configuration for different audio output modes.

The instructions to the vehicles may further include an instruction to move into an orientation, for example, relative to a display screen, relative to a group of users, or relative to one or more of the other vehicles. Alternatively, or additionally, at least one vehicle may be instructed to, when playing the audio content, adjust the position of a roof, a door and/or window of the vehicle, to adapt acoustic characteristics of the audio content heard by the one or more users.

The audio output devices may be speakers mounted on, or inside, the vehicles. For example, the plurality of vehicles may include one or more trucks on which a speaker is mounted. In another example, the plurality of vehicles may include one or more cars with one or more speakers located in their interiors. Where multiple speakers are provided in one vehicle, the instruction to play the audio content may include respective settings for the multiple audio output devices to achieve an audio output with particular acoustic characteristics.

This aspect also provides a computer program that, when executed by one or more processors, causes performance of any of the above methods. For example, there may be provided a computer-readable medium on which is stored computer-readable instructions that, when executed by control circuitry, causes the control circuitry to perform one of the above methods.

This aspect further provides a control system for presenting audio content in an audio output mode, comprising control circuitry, or other means, configured to: determine respective locations for a plurality of audio output devices based on the audio output mode, wherein the plurality of audio output devices are located in respective vehicles, and each of the vehicles includes a driver assistance system; transmit, to each of said vehicles, an instruction for the driver assistance system to move the vehicle to the respective location; determine, based on the audio output mode, one or more audio settings for output of the audio content by respective ones of the plurality of audio output devices; and transmit, to each vehicle of the plurality of vehicles, an instruction to play audio content through the audio output device located in the respective vehicle based on the determined settings.

The control system may be a control system of one of the vehicles. Additionally or alternatively, a control system may be a control system provided by a server that is external to the vehicles. For example, the external system may be provided as a separate device that controls the output of the audio content by the audio output devices and, optionally, the display of corresponding video content on a screen.

The control system may be configured to determine updated locations for the plurality of audio output devices based on a different audio mode, and transmit an updated instruction to at least one of vehicles for the driver assistance system to move the vehicle to the respective updated location.

The control system may instruct the one or more of the vehicles to move into a desired orientation, for example, relative to a display screen, relative to a group of users, and/or relative to the other vehicles. Alternatively, or additionally, at least one vehicle may be instructed to, when playing the audio content, open a door or window of the vehicle, to adapt acoustic characteristics of the audio content heard by the one or more users.

This aspect also includes a system comprising the control system and the one or more vehicles. The audio output devices may be speakers mounted on, or inside, the vehicles. For example, the plurality of vehicles may include one or more trucks on which a speaker is mounted. In another example, the plurality of vehicles may include one or more cars with one or more speakers located in their interiors. Where multiple speakers are provided in one vehicle, the instruction to play the audio content may include respective settings for the multiple audio output devices to achieve an audio output with particular acoustic characteristics.

For the avoidance of doubt, the skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

FIGURES

Examples will now be described by way of example only, with reference to the Figures, in which.

DETAILED DESCRIPTION

Figure 1:
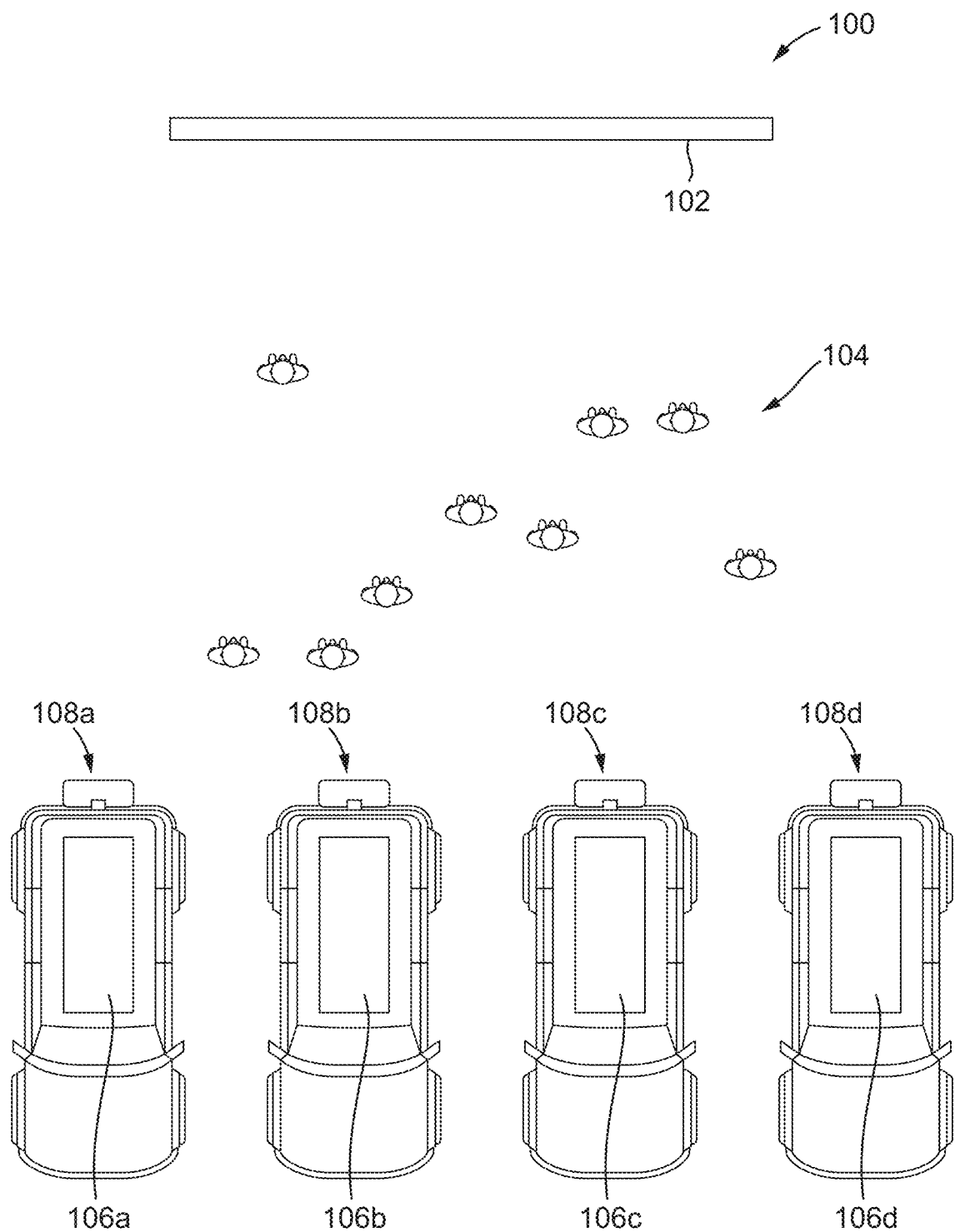
FIG. 1 depicts a system according to an example when operating in a first mode.

FIG. 1 depicts a system 100 according to a first example, in which an audio component of a video displayed on a screen 102 for consumption by a group 104 of users.

Multiple speakers 106a-d are provided in respective vehicles 108a-d. In this particular example, the speakers 106a are mounted onto trucks 108a-d.

In FIG. 1, the audio component is output in a single channel mode. In this mode, multiple speakers 106a-d produce the same output, based on the same audio data.

Figure 2:
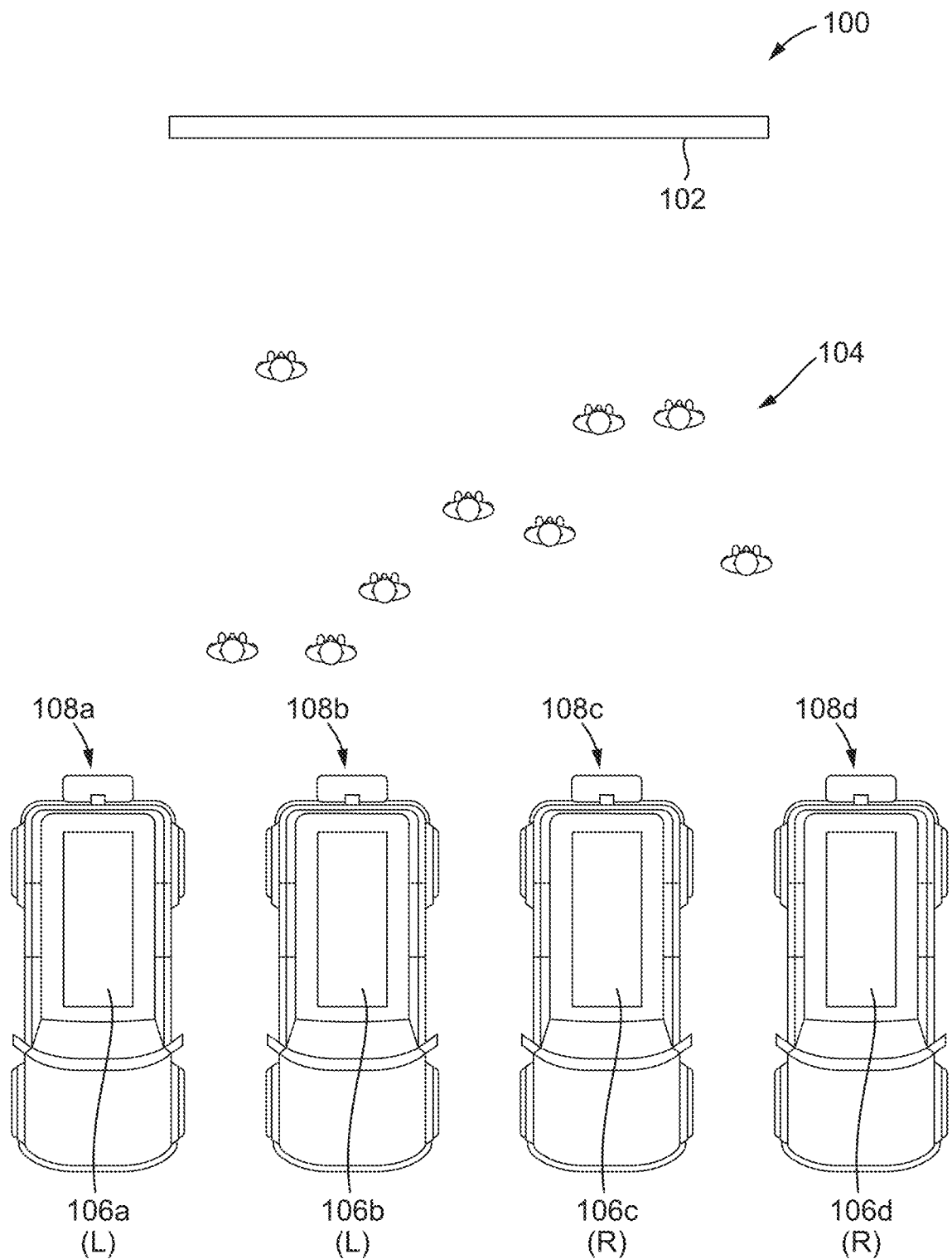
FIG. 2 depicts the system of FIG. 1 when operating in a second mode.

FIG. 2 depicts the system of FIG. 1 when outputting audio in a stereo mode. In this example, two of the speakers 106a, 106b are assigned to a first channel ("left" channel, indicated in FIG. 2 by the label "L"), while the other two speakers 106c, 106d are assigned to a second, different channel ("right" channel, indicated in FIG. 2 by the label "R"). Although the audio data provided to the speakers 106a-d is the same, the output from the left channel speakers 106a, 106b differs slightly from the output of the right channel speakers 106c, 106d, to provide the group of users with stereo sound.

Figure 3:
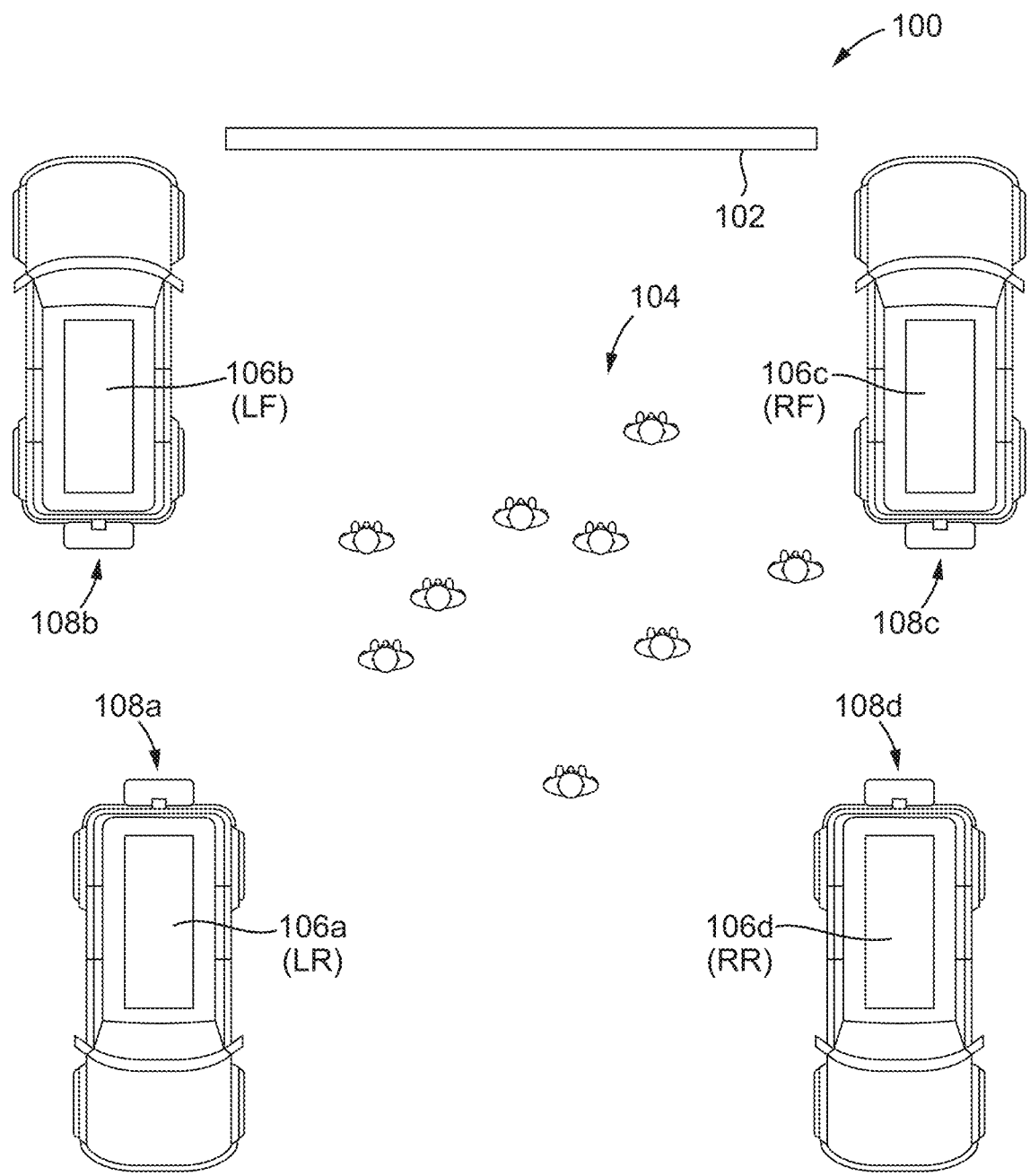
FIG. 3 depicts the system of FIG. 1 when operating in a third mode.

FIG. 3 depicts the system of FIG. 1 when outputting audio in a surround sound mode. In this example, each of the speakers is assigned a different channel. Speakers 106a, 106b are assigned to a "left rear" channel and a "left front" channel respectively, indicated in FIG. 3 by the labels "LR" and "LF", while the speakers 106c, 106d are assigned to a "right rear" channel and a "right front" channel, indicated in FIG. 3 by the labels "RR" and "RF", and each provide slightly different output to provide the surround sound effect.

In addition, vehicles 108b, 108c are in different positions relative to their positions in the single channel and stereo modes shown in FIGS. 1 and 2. In this manner, the system 100 can switch to or from the surround sound mode by changing the audio output from at least some of the speakers 106a-d and, depending on the mode, causing at least some of the vehicles 108a-d to move to another position. In particular, autonomous control is used to place the vehicles 108a-d in suitable positions relative to one another and/or relative to the group of users according to the audio output mode.

Although the system 100 shown in FIGS. 1-3 includes a display screen 102, in other examples, the speakers 106a-d may be used to provide audio content without video being presented on such a screen. For example, the speakers 106a-d may be used to output audio content that is streamed or broadcast, or obtained from an amplification system through which live music is being played. In addition, the system 100 may include other vehicles, e.g., drones, instead of, or in combination with, one or more of the trucks 106a-d. Furthermore, the invention is not limited to the specific audio output modes shown in FIGS. 1-3. Indeed, the system may be used to provide different audio output modes in addition to, or instead of, one or more of the modes described with reference to FIGS. 1-3.

Figure 4:
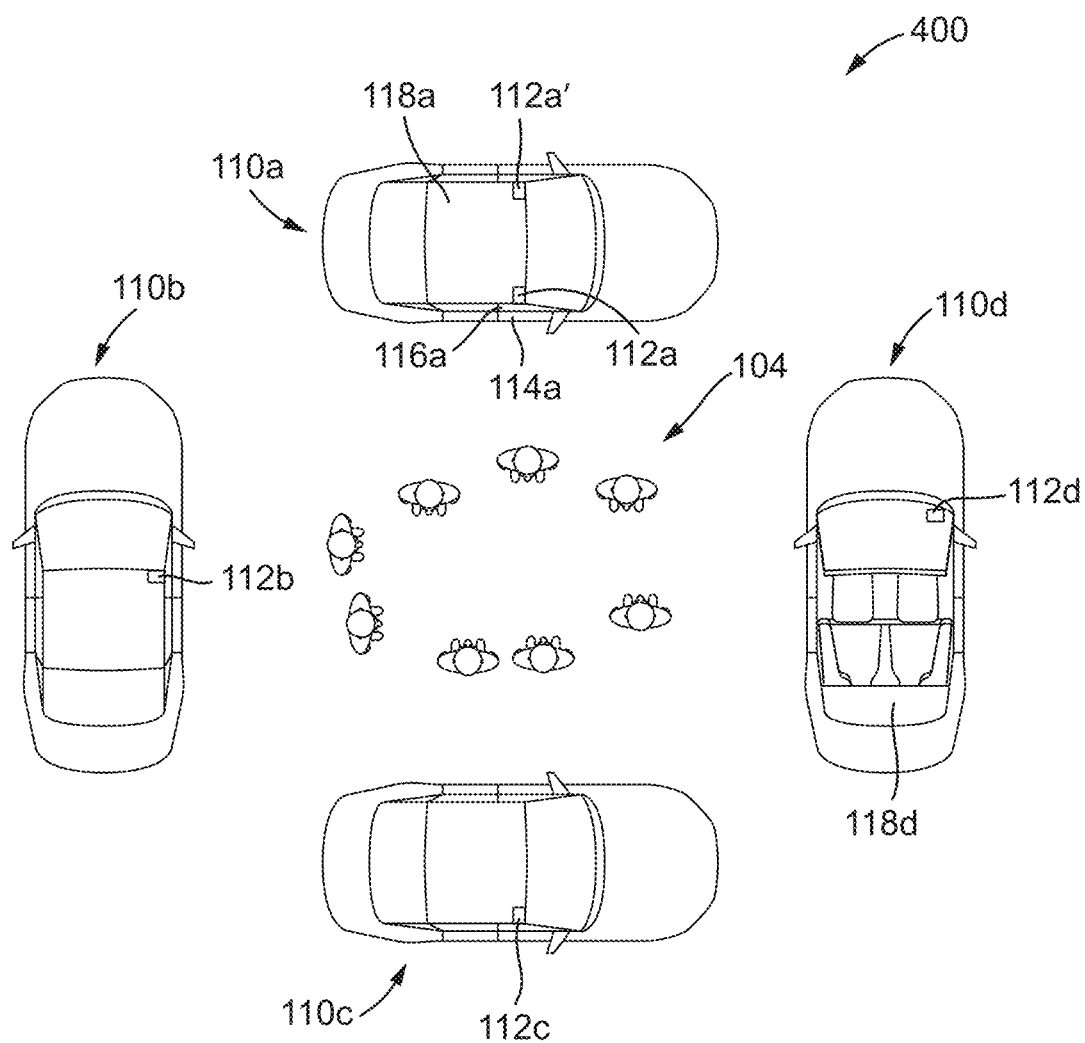
FIG. 4 depicts a system according to another example when operating in a fourth mode.

FIG. 4 depicts an alternative system 400 using different vehicles 110a-110d, in which audio content is presented in yet another mode. In the "auditorium mode" depicted in FIG. 4, the vehicles 110a-d are cars that are positioned so that they surround the group of users 104. Each of the cars 110a-d contain one or more speakers 112a-d that are normally used for providing audio content to users located within the car. For example, the system shown in FIG. 4 includes a car 110a equipped with two speakers 112a, 112a'.

In a similar manner to that described above in relation to FIG. 3, the cars 110a-d can be controlled to move into a configuration for providing a desired audio output mode. Similarly, an auditorium mode may be provided using the system 100 of FIGS. 1-3 by controlling the trucks 106a-d into the respective ones of the positions of the cars 110a-d shown in FIG. 4.

Where a car 110a-d is equipped with multiple speakers, the audio output of each speaker 112a-d, 112a' within the car 110a-d may be adjusted to provide further control over the audio output of the system 100. Additionally or alternatively, the doors and/or windows of each car 110a-d may be controlled to provide control over the audio output experienced by the group of users 104. For example, the door 114a and/or window 116a of car 110a may be opened to a particular extent, or closed, to change how the group of users 104 hears the output of the one or more speakers 112a, 112a'. Similarly, where a vehicle 108d is equipped with a roof 118d that can be opened, then the roof 118d may be controlled to open or close, partially or fully, to change how the group of users 104 hears the output of the speaker 112d.

Figure 5:
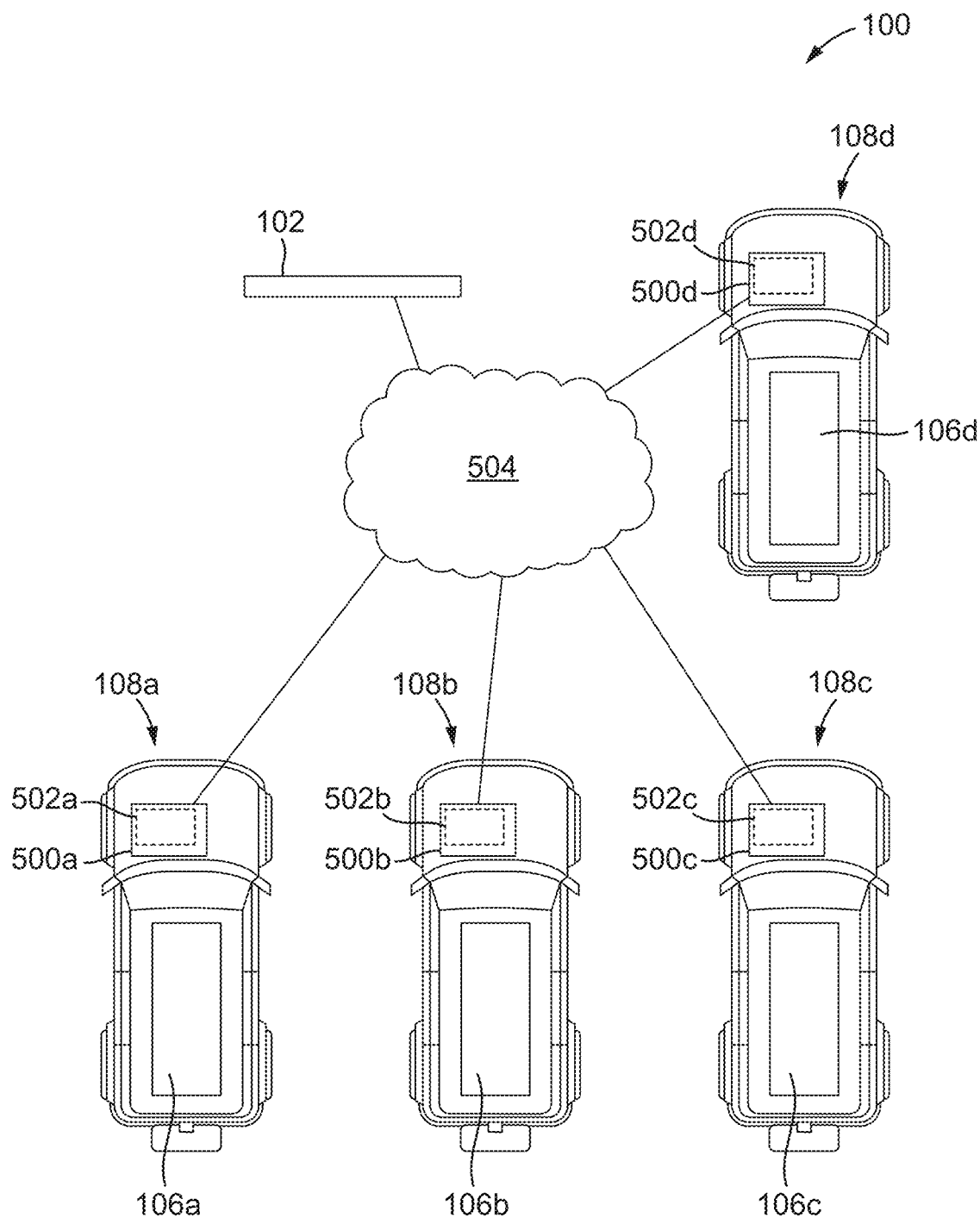
FIG. 5 is a block diagram of the system of FIG. 1.

FIG. 5 is a block diagram of the system 100 of FIG. 1. As shown in FIG. 5, each vehicle 108a-d has a control system 500a-d that includes a driver assistance system 502a-d that can autonomously control the movement of that vehicle 108a-d.

Driver assistance systems provide autonomous control of a vehicle, by controlling the speed and steering of a vehicle. Such systems are conventionally used to maneuver a vehicle to allow hands-off driving while avoiding obstacles, pedestrians, and other vehicles. Examples of driver assistance systems are disclosed in US 2015/0344027 A1, US 2016/0272201 A1, US 2016/0176397, U.S. Pat. Nos. 9,238,467, 9,463,806, and 10,843,705, the disclosures of which are incorporated herein by reference. In the present example, the driver assistance systems 502a-d are used to position the vehicles 500a-d in a position and, optionally, in an orientation, to provide audio content in a particular audio output mode.

In this particular example, the control system 500d of one of the vehicles 108d acts as a master device that instructs the control systems 500a-d of the vehicles 108a-d to play audio content and cooperates with the driver assistance systems 502a-d to cause the vehicles 108a-d to move to a particular position and, optionally, adopt a particular orientation. In addition, the control system 500d, as the master device, may transmit the audio content to be played to the other vehicles 108a-d and/or may control the playing of content on the screen 102, where provided.

The control systems 500a-d can communicate with each other and, where provided, an external server and/or screen 102. The communication network 504 may be, or may include one or more of a BLUETOOTH network, a Wi-Fi network, a cellular communication network, a Local Area Network, a Wide Area Network and the Internet. Although multiple communication networks may be used, only one network 504 is shown in FIG. 5 to avoid complicating the drawing.

Figure 6:
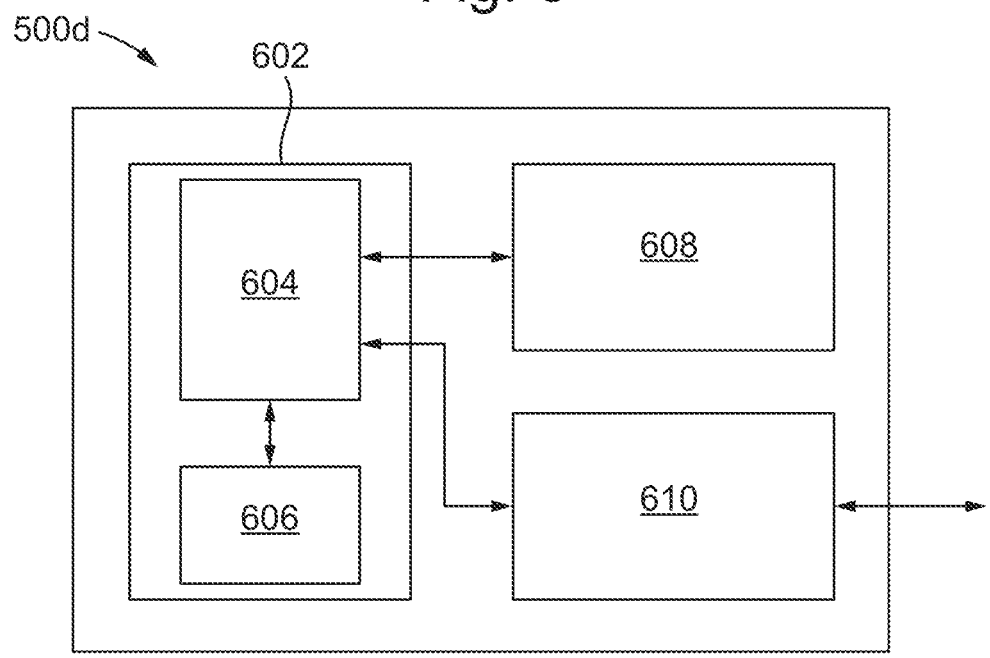
FIG. 6 is a block diagram of a control system of a vehicle in the system of FIG. 1.

FIG. 6 is a block diagram of a control system 500d. The control system 500d includes control circuitry 602. The control circuitry includes a processor arrangement 604 and memory 606. The processor arrangement comprises one or more processors, such as microprocessors, for executing applications based on software stored in the memory 604. The control system 500d also includes memory 608 for storing other data, such as map data, driving history data, etc. The control system 500d also includes one or more input/output paths 610 for transmitting data to, and receiving data from, other components of the vehicle 108a. 610 . . . ?

Figure 7:
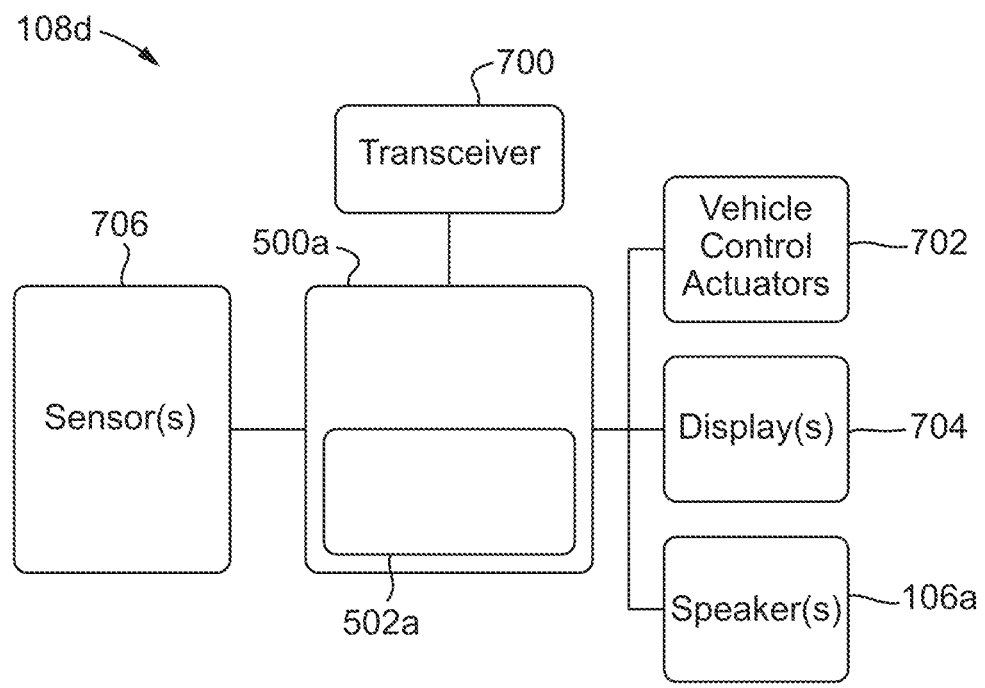
FIG. 7 is a block diagram showing further components of a vehicle in the system of FIG. 1.

FIG. 7 is a block diagram showing other components of the vehicle 108d with which the control system 500d may communicate via input/output path 608. The other components include an on-board transceiver 700 for transmitting and receiving data via the one or more communication networks 504, shown in FIG. 5, and speaker(s) 106a. The transceiver 700 may also receive location data, for example, Global Positioning System (GPS) data, from a GPS network and/or other data via the Internet.

The transceiver 700 may also receive location information from the other vehicles 108b-d, for example, via a BLUETOOTH or Wi-Fi connection. Such location information may be used to determine an updated location for the vehicle 108d based on the locations of the other vehicles, in order to improve the effect of the audio output mode.

A display 704 may be provided for presenting map data, vehicle condition data, navigation instructions or other information to the driver. The display may be a touch-screen display that can receive instructions from a user. For example, Where the control system 500d is used to instruct the vehicles 108a-d to move to locations based on the audio output mode, the display 704 may be used to receive user input indicating audio content to be played and the audio output mode to be used when playing that audio content.

The vehicle 108d also includes vehicle control actuators 702 that are used to move and steer the vehicle 108d based on instructions received from the driver assistance system 502a. One or more sensors 706 may provide data to the control system for use in driver assistance. For example, the one or more sensors 706 may include cameras to capture images of areas in front of and/or behind the vehicle for use in detecting obstructions and hazards. When maneuvering the vehicle 108d into a desired location for audio output, the sensors may be used to determine a position of the vehicle 108d relative to the group of users 104 and/or one or more of the other vehicles 108a-c. The relative position may then be used to update the instruction by adjusting the desired location and/or orientation of the vehicle 108d, for example, to assist in achieving the desired effect of the audio output mode at the location of the group of users 104.

Figure 8:
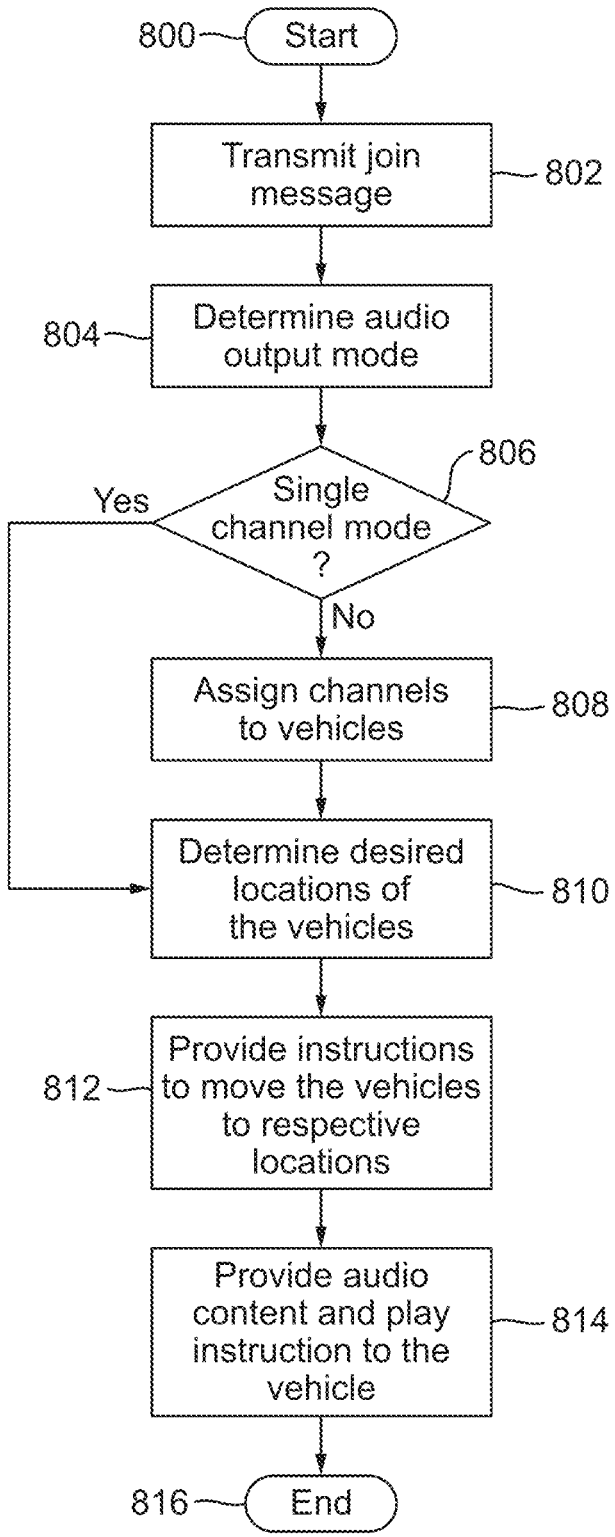
FIG. 8 is a flowchart of a method performed by a master device in the system of FIG. 1.

FIG. 8 is a flowchart of a method that may be performed by the control system 500d of vehicle 108d which, in this example, is acting as a master device with respect to vehicles 108a-c.

Starting at 800, the control circuitry 602 transmits a message to the control systems 500a-c of the other vehicles 108a-c, inviting them to join a session for outputting audio content. The join message may be sent in response to receiving a command, for example, received via display 704, identifying one or more vehicles 108a-d with audio output devices to be used for playing audio content.

A desired audio output mode is determined (step 802). The audio output mode may be identified in a command received from the user. Alternatively, the audio output mode may be determined based on a type of audio content, e.g., spoken work, music, audio component of a specific multimedia content item. In another example, the audio output mode may be determined based on the identified vehicles 108a-d. For instance, if only two vehicles 108a, 108d are to be used to output audio, then either a stereo output mode may be selected. If four or more vehicles are to be used, then a surround sound mode may be selected.

If the audio output mode is not a single channel mode (step 806), then the control circuitry 602 assigns a channel to each of the identified vehicles 108a-d (step 808). If, instead, the audio output mode is a single channel mode (step 806), then each of the vehicles 108a-d will output the audio content with the same settings, regardless of their location.

Desired locations of the vehicles 108a-d are then determined (step 810), based on the audio output mode and instructions are transmitted to move the vehicles 108a-d to those locations (step 812). For example, to use the configuration shown in FIG. 2, a left channel in a stereo output mode is assigned to two vehicles 108a, 108b, while a right channel is assigned to two other vehicles 108c, 108d, and the vehicles 108a, 108b, 108c, 108d are instructed to move into locations based on those assigned channels, and based on the location of the screen 102 and/or group of users 104. In another example, using the surround sound mode configuration shown in FIG. 3, the vehicles 108a-108d are assigned LF, LR, RR and RF channels respectively and instructed to move into the respective locations relative to the screen 102 and/or group of users 104.

The location may be indicated in the instruction as a geographical location, for example, using GPS data. Alternatively, or additionally, a location may be indicated to one of the vehicles 108a as a location relative to one or more of the other vehicles 108b-d, in which case the driver assistance system of vehicle 108a may use output from sensors 706 and/or communications received from the other vehicles 108b-d to move the vehicle 108a to the location.

The desired location determined at step 810 may include an orientation for the vehicle, in which case the instruction transmitted at step 812 may also include the determined orientation.

In some examples, if it is determined that the selected mode is a single channel mode (step 806) then steps 810, 812 may, optionally, be omitted. Alternatively, as shown in FIG. 8, the vehicles 108a-d may be instructed to move to particular locations even if the audio output mode is a single channel mode, for example, to ensure that the vehicles 108a-d are within a certain distance of each other and/or the group of users 104, so that the audio content is not output at an excessive volume.

When it is determined that the vehicles 108a-108d are in the desired locations, or if steps 810 and 812 have been omitted, then the audio content and an instruction to play the audio content are transmitted to the vehicles (step 814). For example, the control circuitry 602 may upload the audio content to the control systems 500a-c of the other vehicles 108a-c via the communication network 504. Alternatively, the control circuitry 602 may stream the audio content to the other vehicles 108a-c over the communication network 504.

The audio content transmitted to the vehicles 108a-d may be identical, or may differ depending on the audio mode and, in multi-channel modes, on the channel assigned to the vehicles 108a-d. For example, in the surround sound mode, the audio content provided to vehicle 108b (left forward channel) may differ from the audio content provided to vehicles 108c, 108d (right rear and forward channels respectively).

The play instruction may include audio settings for the audio output devices 106a-d, such as volume, equalization settings and so on. In another example, such settings may be transmitted separately from the play instruction.

Where a particular vehicle 108a includes multiple speakers, such as speakers 112a, 112a' in vehicle 110a of FIG. 4, then the play instruction may include different settings for the respective speakers 112a, 112a'.

Where one or more of the audio output devices are inside the vehicles, such as the speakers 112a-d inside the cars 110a-d of FIG. 4, then an instruction to, while playing the audio content, open a door 114a and/or a window 116a may be transmitted to a vehicle 110a. That instruction may be included in either of the instructions transmitted in steps 812 and 814 or transmitted as a separate instruction.

When the audio content has been played, the process ends (step 816). In other examples, however, further instructions may be transmitted to the vehicles after step 814, for example, to adjust the audio settings of the audio output device 106a, to open/close a door or window, to change the orientation of the vehicle or to move to another position, for example, when the system 100 is switched to a different audio mode.

Figure 9:
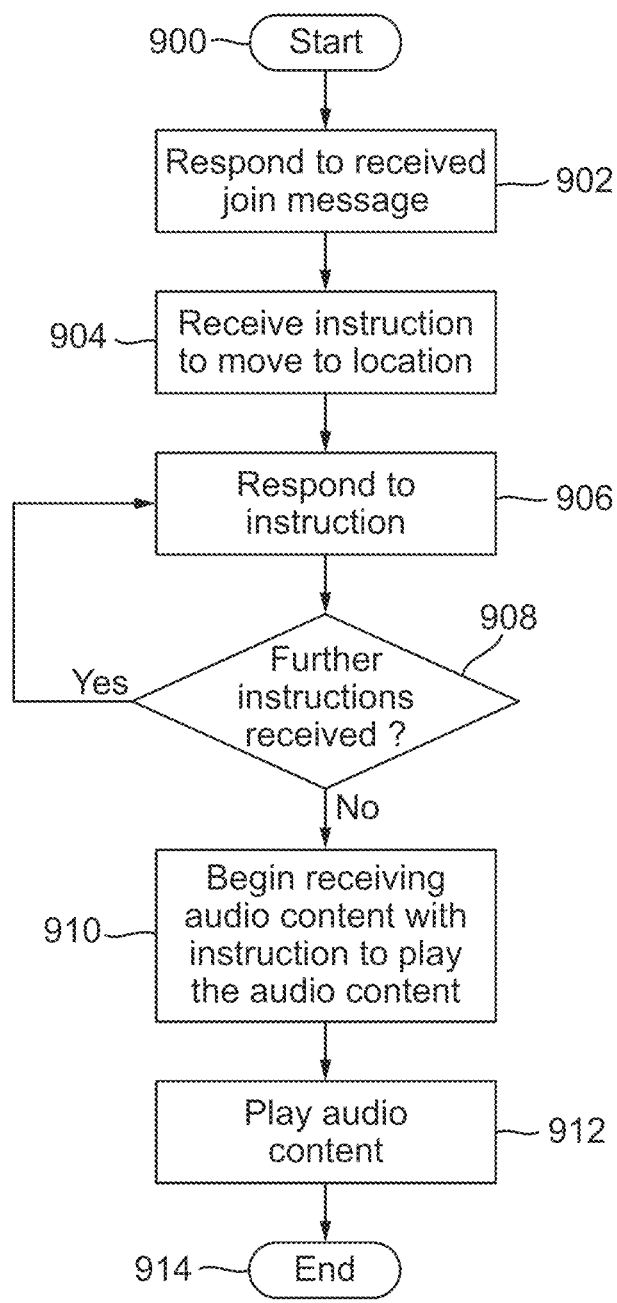
FIG. 9 is a flowchart of a method performed by a slave device in the system of FIG. 1.

FIG. 9 is a flowchart of a method that may be performed by at least one of the vehicles 108a, 108b, 108c when responding to instructions received from a master device such as the control system 500d of vehicle 108d.

Starting at 900, the control circuitry of the control system 500a responds to the join message sent by the control system 500d (step 902).

The control circuitry of the control system 500a then receives the instruction to move to a desired location (step 902). The driver assistance system 502a then uses the vehicle actuators 702 to move the vehicle 108a to the location indicated in the instruction and, if instructed to do so, into a desired orientation. As discussed above in relation to step 812 of FIG. 8, the location may be indicated in the instruction as a location relative to one or more of the other vehicles 108b-d, an intended location for the group of users 104, or the screen 102, and/or as a geographical location. The driver assistance system 502a may thus use any one or more of GPS data, output from the sensors 706, and data received from the other vehicles 108a-c or screen 102 when moving to the location.

If further instructions are received (step 908), then the control system 500a responds accordingly (step 906). For example, an instruction to move to an updated location may be received from the control system 500d, to accommodate divergences between the other vehicles 108b-d and their intended locations and/or to change audio mode. Such a further instruction may specify an orientation for the vehicle 108a, as discussed above in relation to step 904, in which case the driver assistance system 502a is used to reposition the vehicle 108a with the requested orientation. The further instruction may be an instruction to open a door and/or a window of the vehicle while playing the audio content, in which case the control system 500a responds by opening the specified door and/or window.

At step 910, the control system 500a begins receiving the audio content from the control system 500d with an instruction to play the audio content. As discussed in relation to step 814 of FIG. 8, the play instruction may include audio settings such as volume, equalization settings, and so on. Where a vehicle 110a includes multiple speakers 112a, 112a', then the play instruction may include different settings for the respective speakers 112a, 112a'. The audio content may be uploaded or streamed from the control system 500d.

The control system 500a then plays the audio content in accordance with the play instruction (step 912).

FIG. 9 shows the process 900 ending at step 914. However, in other examples, further instructions may be received after playing of the audio content has begun at step 912. Such instructions may be instructions to adjust the audio settings of the audio output device 106a, to open/close a door or window, to change the orientation of the vehicle or to move to another position, for example, when the system 100 is switched to a different audio mode.

Figure 10:
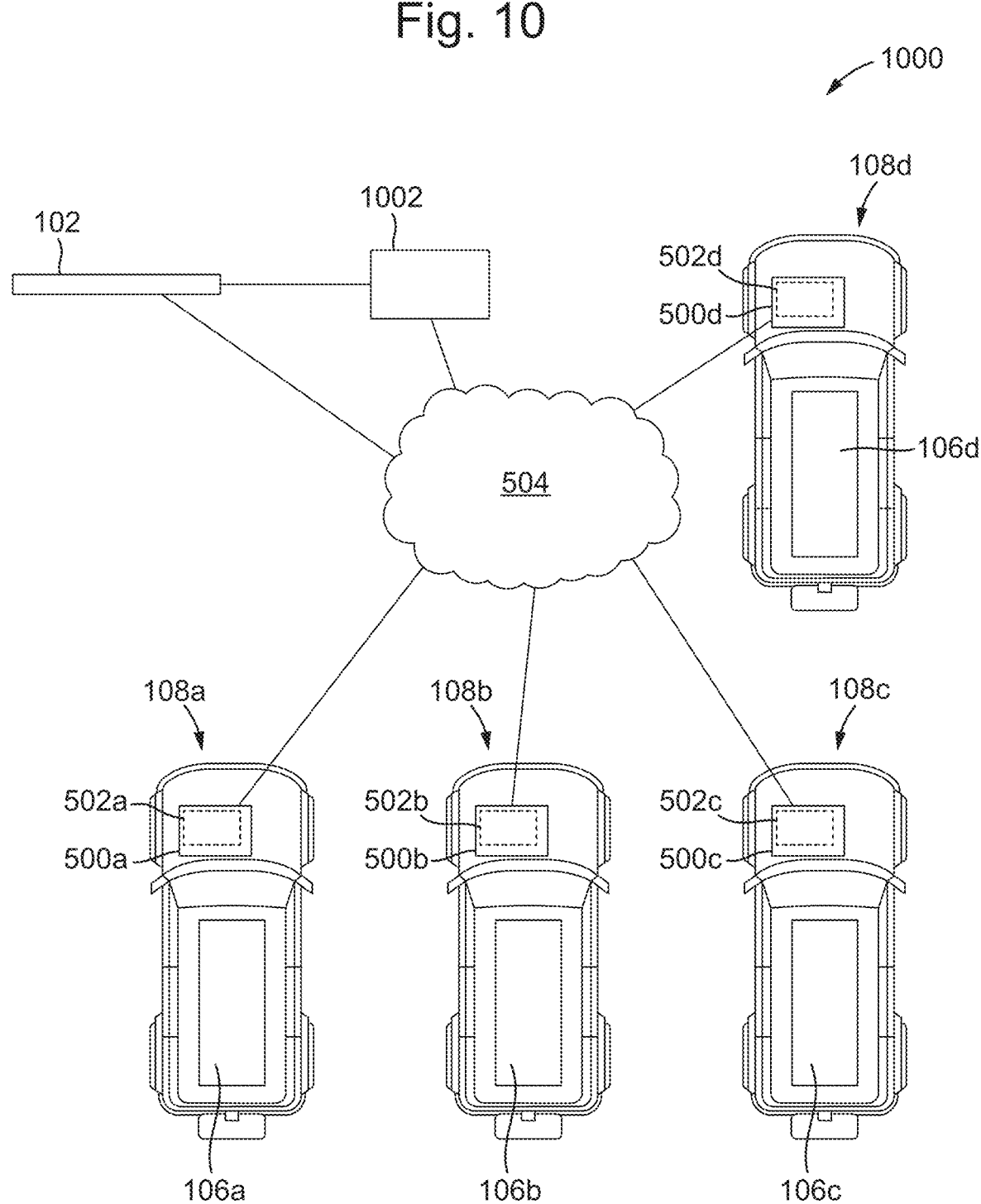
FIG. 10 is a block diagram of a system according to yet another example.

FIG. 10 is a block diagram of the system 1000 according to another example. The system 1000 of FIG. 10 differs from the system 500 of FIG. 5 through the provision of a separate master device 1002 that is external to the vehicles 108a-d. For example, the master device 1002 may be part of the screen 102, a separate server or a user equipment device, such as a smartphone, tablet or laptop computer, executing an application for playing audio and/or video content.

The master device 1002 includes components corresponding to the control circuitry 602, processing arrangement 604, memory 606 and input/output path 608 as shown in FIG. 6 but, unlike the control system 500a, does not include a driver assistance system. In this particular example, the control circuitry 602 of the master device 1002 is arranged to perform the method shown in FIG. 8.

In this example, the master device 1002 can communicate with the control systems 500a-d of the vehicles 108a-d and, optionally, with a screen 102, via the one or more communication networks 504. In this manner, the master device 1002 can control the output of content through the speakers 106a-d and, where provided, the screen 102, and control the movement of the vehicles 108a-d to provide audio output in a desired mode. The master device 1002 may also provide the audio content to be played to the vehicles 108a-d, for example, by transmitting it via the communication network 502.

It will be understood that the invention is not limited to the examples described above and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method for presenting audio content in an audio output mode, comprising:
   determining respective desired locations for a plurality of audio output devices based on the audio output mode, wherein the plurality of audio output devices are located in respective vehicles;
   transmitting, to each of said vehicles, an instruction for moving the vehicle to the respective location;
   determining, based on the audio output mode, one or more audio settings for output of the audio content by respective ones of the plurality of audio output devices; and
   transmitting, to each vehicle of the plurality of vehicles, an instruction to play audio content through the audio output device located in the respective vehicle based on the determined settings;
   wherein the instruction includes an instruction to move the respective vehicle into an orientation relative to a display screen and relative to a group of users, and
   wherein the audio output mode is determined based on a type of audio content.

2. The method of claim 1, further comprising transmitting, to at least one vehicle in the plurality of vehicles, an instruction to, when playing the audio content, open at least one of a door, window, or roof of the vehicle.

3. The method of claim 1, wherein the instruction to play the audio content includes respective settings for multiple audio output devices in one of the vehicles.

4. The method of claim 1, further comprising:
   transmitting, to a display device, an instruction to display a video component of a multimedia asset;
   wherein the audio content is an audio component of the multimedia asset.

5. The method of claim 1, further comprising:
   receiving location information from a first one of the vehicles, wherein the location information indicates the location of the first vehicle relative to a user and/or another vehicle of the plurality of vehicles;
   determining an updated location for the audio output device in the first vehicle based on the received location information; and
   transmitting, to the first vehicle, an instruction to move to the updated location.

6. The method of claim 1, further comprising:
   determining updated locations for the plurality of audio output devices based on a different audio mode; and
   transmitting, to at least one of the vehicles, an instruction to move to the updated location.

7. A non-transitory computer-readable medium on which is stored computer-readable instructions comprising:
   an instruction to determine respective locations for a plurality of audio output devices based on the audio output mode, wherein the plurality of audio output devices are located in respective vehicles;
   an instruction to transmit, to each of said vehicles, an instruction for moving the vehicle to the respective location;
   an instruction to determine, based on the audio output mode, one or more audio settings for output of the audio content by respective ones of the plurality of audio output devices; and
   an instruction to transmit, to each vehicle of the plurality of vehicles, an instruction to play audio content through the audio output device located in the respective vehicle based on the determined settings;
   wherein the instruction includes an instruction to move the respective vehicle into an orientation relative to a display screen and relative to a group of users, and
   wherein the audio output mode is determined based on a type of audio content.

8. A device for presenting audio content in an audio output mode, comprising:
   control circuitry configured to:
   determine respective desired locations for a plurality of audio output devices based on the audio output mode, wherein the plurality of audio output devices are located in respective vehicles;
   transmit, to each of said vehicles, an instruction for moving the vehicle to the respective location;
   determine, based on the audio output mode, one or more audio settings for output of the audio content by respective ones of the plurality of audio output devices; and
   transmit, to each vehicle of the plurality of vehicles, an instruction to play audio content through the audio output device located in the respective vehicle based on the determined settings;
   wherein the instruction includes an instruction to move the respective vehicle into an orientation relative to a display screen and relative to a group of users, and
   wherein the audio output mode is determined based on a type of audio content.

9. The device of claim 8, wherein the control circuitry is further configured to transmit, to at least one vehicle in the plurality of vehicles, an instruction to, when playing the audio content, open at least one of a door, window or roof of the vehicle.

10. The device of claim 8, wherein the control circuitry is further configured to include, in the instruction to play the audio content, respective settings for multiple audio output devices in one of the vehicles.

11. The device of claim 8, wherein the control circuitry is further configured to transmit, to a display device, an instruction to display a video component of a multimedia asset, wherein the audio content is an audio component of the multimedia asset.

12. The device of claim 8, wherein the control circuitry is further configured to:
   receive location information from a first one of the vehicles, wherein the location information indicates the location of the first vehicle relative to a user and/or another vehicle of the plurality of vehicles;
   determine an updated location for the audio output device in the first vehicle based on the received location information; and
   transmit, to the first vehicle, an instruction to move to the updated location.

13. The device of claim 8, wherein the control circuitry is further configured to:
   determine updated locations for the plurality of audio output devices based on a different audio mode; and
   transmit, to at least one of the vehicles, an instruction to move to the updated location.

14. The device of claim 8, in the form of a smartphone, tablet, or laptop computer.

15. A vehicle comprising the device of claim 8.

16. A system comprising:
   the device of claim 8; and
   said plurality of vehicles.

17. The system of claim 16, wherein each of the plurality of vehicles includes control circuitry configured to:
   receive the instruction to move the vehicle to the respective location; and
   move the vehicle to the respective location using a driver assistance system.

18. The system of claim 17, wherein the control circuitry of each of the plurality of vehicles is further configured to:
   receive an instruction to open a door and/or a window while playing the audio content; and
   while playing the audio content, open said door and/or window.

* * * * *